United States Patent Office 2,853,928
Patented Sept. 30, 1958

2,853,928

METHOD FOR CURING CONCRETE

William J. Reardon, Cincinnati, Ohio, assignor to Reardon Industries, Inc., Cincinnati, Ohio, a corporation of Ohio No Drawing. Application April 26, 1955
Serial No. 504,112

3 Claims. (Cl. 94—22)

The present invention relates to the curing of concrete.

An object of the invention is to provide an improved procedure or method of curing concrete whereby the resulting cured concrete is greatly improved in several important respects.

A further object of the invention is to provide a method which utilizes a composition that is easily, safely and economically applied as a self-adherent dry powder film, to any fresh soft concrete surface and/or to forms and molds that are to receive poured concrete, for improving the surfaces of cast concrete elements and to serve as a releasing agent that will not soil either the forms or the concrete surfaces.

Another object of the invention is to provide an improved method and means for making terrazzo floors.

These and other important objects are attained by the method and means hereinafter set forth.

Prior known means and methods of curing concrete have left much to be desired. The presence of free water-soluble alkali, particularly that due to incomplete hydration in concrete, however made and/or cured in the past, demonstrates convincingly that the chemical reaction (known as curing) which takes place in the concrete mass has not converted the component materials completely into water insoluble, strong bonding material according to the accepted theory of the reaction. The universal avoidance of applying oil base paints and enamels to concrete without preliminary preparation of the concrete surface corroborates the fact that free water-soluble alkalis were present, and were expected as a matter of course in concrete as heretofore made. Regardless of the need for decoration of concrete, the presence of free water-soluble alkalis promotes efflorescence, and porosity of the mass at the surface with tendencies toward dusting, wear and deterioration on continued exposure to the elements in many climates. It is moreover believed that surface checking and crazing, and some cracking of concrete when not under load, may be logically attributed to a non-uniform cure throughout the mass and certain internal stresses resulting therefrom.

According to the improved method of the invention a more uniform cure of the concrete mass is attained, and unexpected improvements in the surface texture and appearance of the slab result along with a denser and harder surface and mass.

The procedure followed in my improved method begins with a consideration of the earliest practical moment at which the control of the chemical reaction in the freshly cast concrete mass can be exerted. The important step in the curing method of the invention is to apply a control medium of a specially suited type to the concrete surface as soon as possible after it is no longer necessary to disturb the mass, e. g. immediately after finishing with a float or trowel. I have found the improved results in concrete on which the control of the cure was begun in a matter of say thirty minutes or less following the finishing operation. Since the mass is very soft and very wet due to the surface water of the mix, I found it necessary to devise a newly utilized curing medium that may be applied to soft, fresh, wet concrete without detrimental results in order that the earliest possible control of the cure may be exerted.

My hereinafter described curing composition is in dry powdered form; is water-repellent and non-wettable, and contains fine anhydrous and nearly pure silica particles as a preferred component to aid in the placement of the mixture and for other purposes in order to eliminate the disadvantages of prior known curing materials. My presently preferred water-repellent component is selected from the metal soaps which have been recognized as having some value as catalysts and conceivably serve as such during the curing of concrete by my method.

Straw, burlap, paper and other prior known "curing" materials do not permit a properly controlled dissipation of that part of the water of the concrete mix which is not required for the chemical reaction with the soluble portion of the mix, and they cannot be applied directly on the top water of the newly finished mass because materials such as these are wettable or absorbent and take up water at the surface, including some of the critically needed local water. Evaporation of absorbed moisture from such material may create a detrimental surface cooling, and/or a temperature differential at different levels in the mass, so that the curing proceeds at non-uniform rate and sets up localized internal stresses in the mass.

Curing solutions of waxes etc. in a volatile liquid solvent are known to produce some undesirable effects on the concrete surface itself if applied too early because some degree of unwanted reaction occurs with the concrete mix during the initial critical period in which unusual benefits are made possible by my method and composition. The volatile solvent is usually inflammable and hazardous when used indoors. Of course water cannot be added to the surface of soft wet concrete for curing purposes.

The presence of free water-soluble alkali or unhydrated components in concrete appears to have resulted as a heretofore unavoidable effect of faulty control of the chemical curing action in the mass and to the lack of control of the rate of evaporation of some portion of the water of the mix necessary for hydration, thus permitting the curing reaction to terminate without converting all of the alkaline water-soluble material into insolubles during this nascent period. Due to working and settling of the plastic concrete mass the free (and excess) water-solubles concentrate near and at the surface in the water of the mix where they ultimately render the concrete porous and weak.

It is not inconceivable that, under some circumstances of a particular mix of the concrete and the manner of surface finishing the same, there may be some of the active alkali available in the nascent state substantially at the surface of the mass and in solution with the laitance, and further that during the particularly active chemical reaction adjacent the surface, some of the lowermost silica particles in my curing composition may become in part freed of their powdered coating and exposed to the chemical curing action at the surface. To that extent these silica particles will be capable of entering into the chemical combination with active alkali to produce the nascent insolubles in addition to those evolved in the water-cement mix.

At this point it should be noted that the insoluble, strong bonding materials in concrete are derived largely from the Portland cement in the presence of water in the concrete mix as a result of the curing action. The undesirable water-solubles in concrete are those which were derived from the cement-water mix and did not combine to produce insolubles during the active curing period.

In a well proportioned concrete mix it is believed that the chemical conversion of the silica particles of the composition into insoluble components of the concrete itself may occur to a very limited degree from the standpoint of the actual number of minute silica particles involved, but any particles which are thus converted will obviously use available free excess alkali in a most beneficial manner and replace such free alkali with an insoluble silicate in the concrete surface. Hardness, density and strength are increased, and alkalinity, weakness and porosity are correspondingly reduced.

The aforementioned objects and disadvantages are surmounted ot a large degree by the use of the method and composition of my invention which afford a critical control of the rate of water evaporation and a critical control of the exothermic heat due to the chemical reaction, and by insulating the mass against rapid loss of this internal heat, as well as against changes due to atmospheric temperatures or to cooling from too rapid surface evaporation.

The method of the present invention consists in utilizing a non-absorbent and water-repellent film-like dry powder cover or coating blanket on the surface of the freshly finished, wet, soft concrete at a critically early period and utilizing its protective and insulating properties to maintain a more uniform condition within the concrete mass and cause an immediate reduction of water evaporation and also to regulate and beneficially control its rate thereafter until the cure is complete.

The object sought is to secure a more thorough and more uniform curing of the mass and a maximum development, from the water-cement mixture, of the nascent reaction products which ultimately form the desired water-insoluble strong bonding materials such as CaO; $SiO_2$; $Fe_2O_3$; and $Al_2O_3$; and to correspondingly reduce, to a negligible minimum, the water soluble free alkali such as $Ca(OH)_2$, that was heretofore assumed to be unavoidable in concrete regardless of whether or not any control of the curing action had been attempted.

A composition best suited for the practice of my method includes a very finely divided, dry, water-repellent film-producing powder in mixture with dry finely divided, water proof, inert and non-absorbent material in crystalline form, so that each crystal is adherently coated with the powder to prevent wetting of the surface of the crystals with the top water or the moisture of the concrete on which the composition is applied. In preparing such a composition I utilize a water-repellent salt of a fatty acid preferably an insoluble metal soap for the dry film producing material, and a non-absorbent, non-porous, inert crystalline material, preferably silica in as nearly pure form as possible. In practice $SiO_2$, at least 99% pure form, is utilized in the proportion of about eighty (80) parts (by weight) to about twenty (20) parts (by weight) of the said salt.

The salt or salts of fatty acids suitable for film producing water-repellents in my new composition include any of the metal salts of fatty acids that are water-repellent and substantially non-absorbent or are insoluble in water within the temperature range likely to be encountered in concrete work in the field or elsewhere, and which do not chemically combine with the components of the concrete mix when cast and in wet or moist state. The metal salts need not be one selected metal salt of these characteristics but may be in mixture with others of the same characteristics.

By preference I employ the salts of fatty acids that are in good supply and of relatively lower cost, presently calcium stearate. Some of the other metals exhibit the desired palmitates of some of the other metals exhibit the desired characteristics and may be used, and the salts of certain other metals with some of these or other fatty acids are also useful.

Amongst other useful salts are aluminum palmitate, zinc stearate, calcium oleate, zinc oleate and perhaps others may from time to time be found cheaply available.

The salts are, in order of preference, those that are water-repellent, non-reactive, light in weight and color and which exhibit the physical characteristics in most marked degree. Useful, but less attractive, are those which are very slowly soluble in or are very slowly wettable with water and which have the remaining desired characteristics. Calcium stearate is one of the preferred water-insoluble metal salts.

The composition of the invention is made, for example, by placing calcium stearate 20% (by weight), and silica (99%+pure) 80% (by weight) in a ball mill and triturating and/or mixing the same until a fine and practically amorphous white powder composition is formed. The percentages are not extremely critical and may be varied so long as the adherent dry salt particles are sufficiently weighted by the silica particles, and the silica particles are surrounded, separated and rendered non-wettable by the adherent water-repellent salt particles.

For expediency in manufacture I prefer to use, as starting materials, calcium stearate approximately 80% passing through a 200 mesh screen and approximately 100% passing through a 300 mesh screen, and the aforesaid pure silica approximately 75% passing through a 325 mesh screen. In this way the milling time is reduced to an hour or so, and in the process the stearate is further reduced in particle size and tends to adhere together in tiny, soft crumbly lumps in which the silica particles, reduced in size to a lesser degree, are contained in a well distributed and adherently coated condition by the stearate. The light weight stearate constitutes the greater percentage volume in the mixture.

The resultant dry powdered, water-repellent composition of the invention has an ideal specific gravity for my purposes and will adhere as a dry film to any surface whether wet, moist or dry, or at any angle, without separation of the components. It forms a dry, self-sealing powder film on the surface of water without settling out of silica particles during apparently an indefinitely long time beyond that required for the important active curing action in concrete, say seventy-two hours.

The curing composition of the invention is easily and quickly applied to the exposed top surface of wet soft concrete in a thin layer by scattering it by hand or mechanically by any suitable powder spraying device. The quantity used in proportion to the surface area to be treated is quite small as only a thin film is required.

My dry powder composition is applied to the surfaces of forms or molds that are to confine poured concrete in order to attain the benefits of my method on the corresponding faces of the poured concrete mass. The molding surface of such forms may be concrete and/or metal or wood and the application of my dry powder composition thereto may include rubbing the powder into the surface. The surfaces thus treated are kept clean, water-repellent and unsoiled in appearance and the composition acts as a releasing agent that has none of the objections of the so-called "form oils" or wax solutions in an evaporable solvent known and used for the purpose. New lumber used initially for concrete forms and later for building construction is kept in unsoiled and practically new condition when initially treated with my composition, and the concrete molded in the forms of such lumber easily separates therefrom and has the remarkably improved concrete surface texture and appearance resulting from my method.

The ingredient materials have no adverse effect on the active ingredients of the concrete mix at any time, but on the contrary they serve to bring about an unique and enhanced surface condition from the standpoint of appearance and surface density and texture. This is due in the main to the fact that all of the chemical, thermal and physical factors involved in the curing action are under a nearly perfect control that may include a catalytic action of the insoluble metal soap at the surface areas where the water and Portland cement is most abundant and at times richer than elsewhere in the mass.

A film of my preferred composition which is of intense snow whiteness in color, remains adherently in place as an insulating medium which reduces, in the concrete mass, the effects of atmospheric temperatures, external temperature changes, and the radiant heat of the sun. It also provides for a more uniform temperature in the mass and a more uniform distribution of the exothermic heat that evolves at some degree during the continuing chemical reaction in the mass, and especially during the more active curing period. The rate of evaporation of the water of the mix, that is not involved in changing the alkalis to water insoluble bonding media in the nascent state, is reduced and is controlled with regularity. The gases liberated and the vaporized water can rupture the weak, light and continuous dry powder film of composition on the surface of the mass, and the film instantly reseals itself whenever the pressure is relieved.

The effective and timely exerted control of the chemical curing activity in the concrete mass, which affords enchanced amounts of insolubles in the final structure at the expense of undesirable potential water-soluble alkalis and thus diminishes the latter to a negligible percentage, is believed to be in a large degree the result of the insulating and evaporation retardant properties of the unique self-sealing dry film afforded by my curing composition. However the possibility that some catalytic action may be exerted adjacent the surface of the mass by an insoluble metal soap, such as the calcium stearate of my curing composition, is not to be excluded in view of the exceptionally dense and non-absorbent, clean, stony surface of concrete as cured according to my method and using my preferred composition.

When a desired curing period has elapsed, the dry continuous powder film remains substantially in its original condition and is then removed quickly and easily. Where great areas are covered it may conceivably be considered economical to remove the material with an air suction mechanism for reuse of the composition, following which any residual particles may be removed with water flushing and brooming to present a completely clean concrete surface when the latter is desired. The composition is non-toxic and non-flammable so that it may be used indoors where some prior known materials were dangerous or very objectionable otherwise. Once placed on a surface it does not easily blow around in the wind. It is not irritating to the skin.

As a matter of practice and in view of the relatively small amount of material and the low cost thereof, the composition is ordinarily flushed and broomed off with water and directed into the nearest sewer drain which will harmlessly carry the material away. Since the material floats as a continuous, attenuated, self-sealing film on water, the disposal of the material into city sewers, or elsewhere, may be of some incidental value in retarding the rise of noxious odors to the atmosphere. The composition itself has no characteristic odor.

In practicing the method of my invention I secure a heretofore unattained concrete, namely concrete that is apparently devoid of uncombined, deleterious components; that has a harder and denser and less porous surface than could otherwise be attained with the same mix; and the surface has a bright clean and flinty or stone-like appearance which is unusually pleasing as such and which surface can, when dry, be satisfactorily painted with oil base paints and enamels.

The strength of the mass is improved by reason of the relatively uniform cure throughout the mass and a very substantial reduction in internal stresses or localized weaknesses.

The method consists in the critical step of covering the freshly finished surface of the concrete at the earliest practical moment with a dry, water-repellent film of thin, self-sealing composition, derived for example by the application of the composition of the invention herein described, while the concrete mass is still very wet and very soft. I have found that the composition when applied within the twenty to thirty minute period following the finishing operation will yield remarkably fine results. In view of the nature of the composition the latter may be beneficially applied without any delay following the pouring of concrete since the material will form a continuous imperforate, self-sealing, dry film even on top of free surface water of the mix.

If the application be delayed however beyond say a half hour or so depending on weather conditions, the unusual benefits of my method appear to be correspondingly reduced.

My dry powder composition has the advantages of minimum bulk and ease of application at any time, although the unusual surface texture and appearance that result from the practice of my indicated method are lost if the application is delayed say for two or three hours after the floating and troweling of the concrete, which is incidentally the time when it is customary or feasible and practical to apply prior known curing agents such as straw, paper or burlap, or perhaps the wax or resin solutions. It appears that my composition exerts a better regulation of any uncompleted curing action potential that exists in the fresh concrete at the time the composition is applied.

While no detrimental results follow from a heavier application of my composition under any circumstance a visible film is all that is needed, and economy of time of application and of the composition itself may form a worthwhile consideration on large paving projects. Hauling costs to the job are reduced because of light weight and the unusually large covering power of the composition.

The benefits of earlier application of the curing composition tends to expedite the entire project with appreciable overall savings in costs of labor, time and materials in addition to the assured increase in strength, and reduction in surface porosity. The latter of course reduces the likelihood of dusting under traffic, and the absorption of moisture.

The unusually clean crisp, flinty uniform appearance over the entire surface is unique in the art.

In making terrazzo floors the same advantages of my method and composition are derived by curing the cement in the terrazzo mix with a covering of my composition distributed over the watery and flattened surface immediately after the terrazzo mass is compacted in the usual way to fill all voids and bring the water to the surface. The dry, self-sealing film of curing compound is allowed to remain during a curing period of approximately seven (7) days, following which the abrasive grinding and polishing wheels are used with some added water and without removing the curing composition. The silica particles and the insoluble salts of the composition aid materially in securing a more selective grinding and polishing action so that the surface of the terrazzo floor is rendered smoother and better polished. When the scum and residue is washed and scrubbed away, the hard and less porous cement that is exposed between the polished aggregate chips, shows the clean flinty appearance that pleasingly accentuates the polished chip pattern. A harder and better appearing terrazzo floor results by first using the composition to attain a more perfect cure and thereafter using the residual curing composition as a buffer material for the grinding and polishing wheel in finishing the floor.

The practice of my method of curing concrete or cement work will be noted to offer every incentive for careful observance of the procedure according to my method and the savings in time heretofore required for hauling bulkier curing materials to and away from the job warrant the use of particular supervision, if needed, on large jobs to secure proper attention to the correct and timely application of composition. Field inspection of the procedure of the invention is facilitated and made more accurately by reason of the immediate visual detection of uncovered surfaces which would lack the intense unchanging white color of the composition.

What is claimed is:

1. The method of producing improved concrete characterized by a uniform, clean, stony appearing and dense surface which is substantially devoid of free water-soluble alkali, which includes the steps of finishing off the surface of freshly cast concrete with maximum dispatch and in desired manner and, substantially forthwith, while the surface is still very wet and soft, distributing over the surface a dry finely pulverulent mixture of a water-repellent salt of a fatty acid and finely divided, substantially pure silica crystals, to form a continuous, self-sealing, dry film on the surface, allowing the film to remain in place until the concrete is hard and dry enough for use, then removing the dry powdered film producing mixture from the dry concrete surface.

2. The method of producing improved concrete characterized by a uniform, clean, stony appearing and dense surface that is substantially devoid of free water-soluble alkali, which includes the steps of finishing off the surface of fresh cast concrete with maximum dispatch in desired manner, and substantially forthwith, while the surface is still very wet and soft, distributing over the surface a thin dry and finely pulverulent mixture of water-repellent salt of a fatty acid and finely divided substantially pure silica crystals, to form a continuous, self-sealing, dry film on the surface, allowing the film to remain in place until the concrete cures, then removing the dry powdered film producing mixture from the dry concrete surface by floating and flushing the powder away with water, and ultimately into a convenient sewer drain.

3. The method of making terrazzo flooring which comprises the steps of casting terrazzo concrete on a base, tamping and leveling said concrete to bring excess water to the surface, forthwith dusting the surface with a dry filming composition comprising powdered, dry water-repellent metal soap particles and finely divided silica particles, allowing the dry powder film to remain while the concrete cures, at a controlled rate, beneath the film and dries and hardens during about seven days, then grinding and polishing the surface with abrasive wheels and water before removing the said filming composition, and finally removing the residual free material from the surface by washing and scrubbing with water.

References Cited in the file of this patent

UNITED STATES PATENTS

| | | |
|---|---|---|
| 1,737,006 | Ellis | Nov. 26, 1929 |
| 1,859,253 | Cross | May 17, 1932 |
| 2,010,025 | Kirchner et al. | Aug. 6, 1935 |
| 2,036,300 | Rodman | Apr. 7, 1936 |
| 2,194,683 | Badollet | Mar. 26, 1940 |
| 2,245,040 | Marks | June 10, 1941 |
| 2,289,248 | Davis | July 7, 1942 |
| 2,344,578 | Whitesides | Mar. 21, 1944 |
| 2,344,579 | Whitesides | Mar. 21, 1944 |